United States Patent Office 2,853,606
Patented Sept. 23, 1958

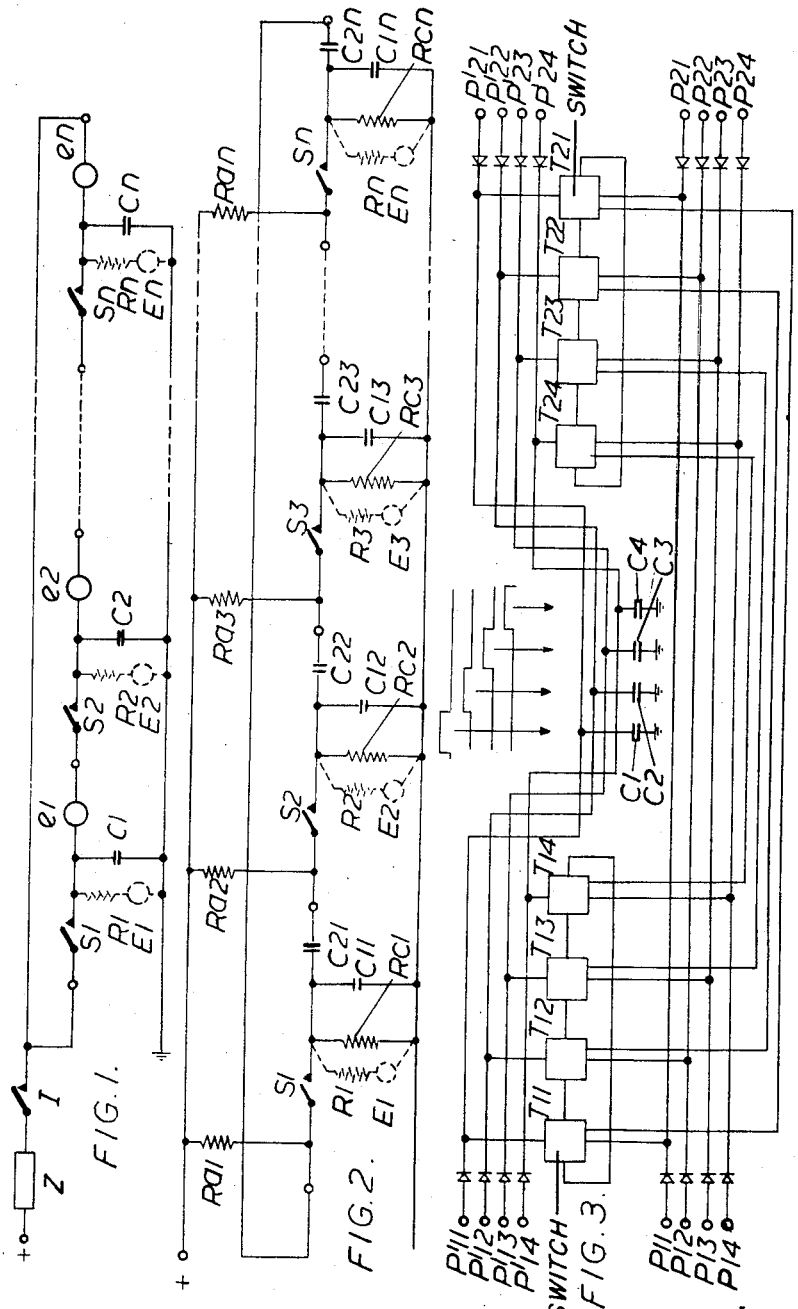

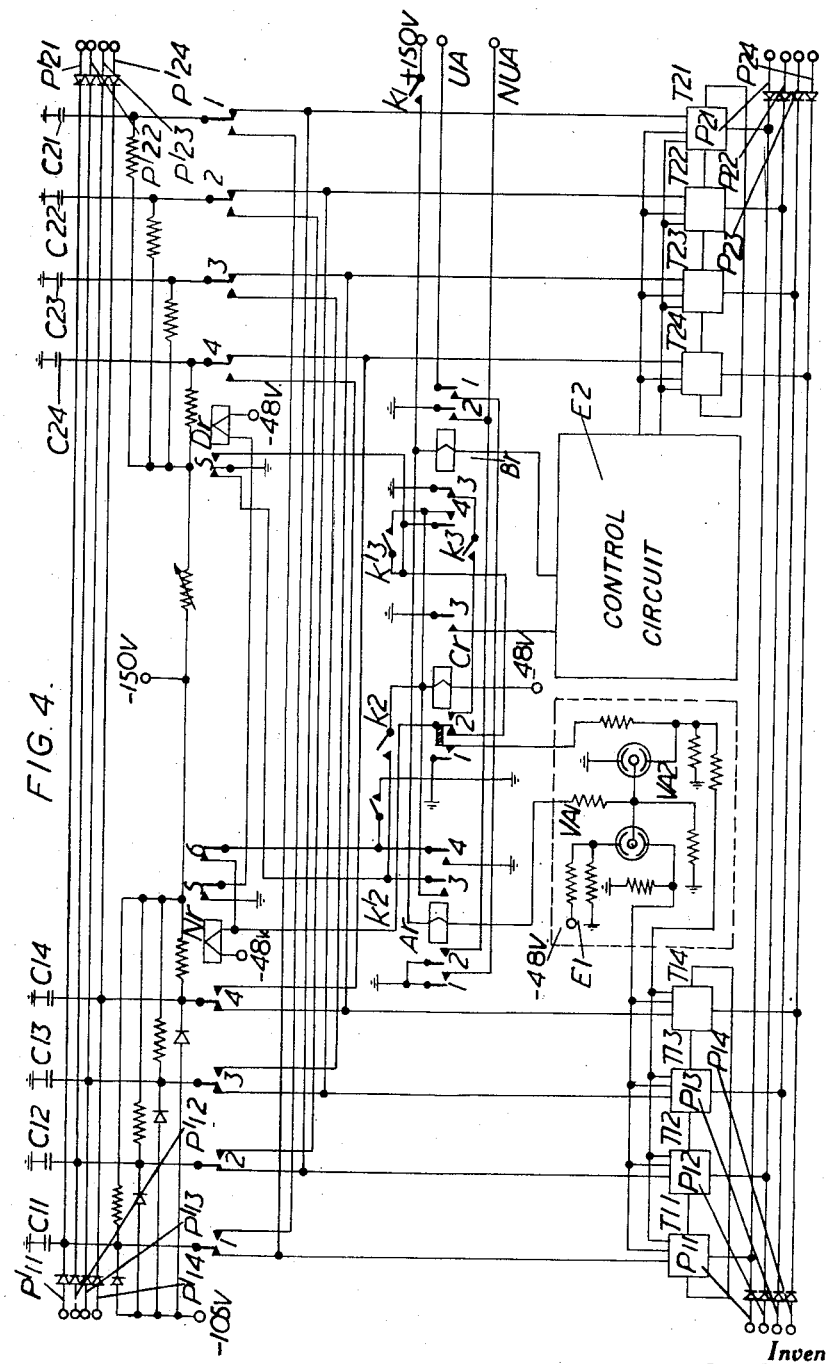

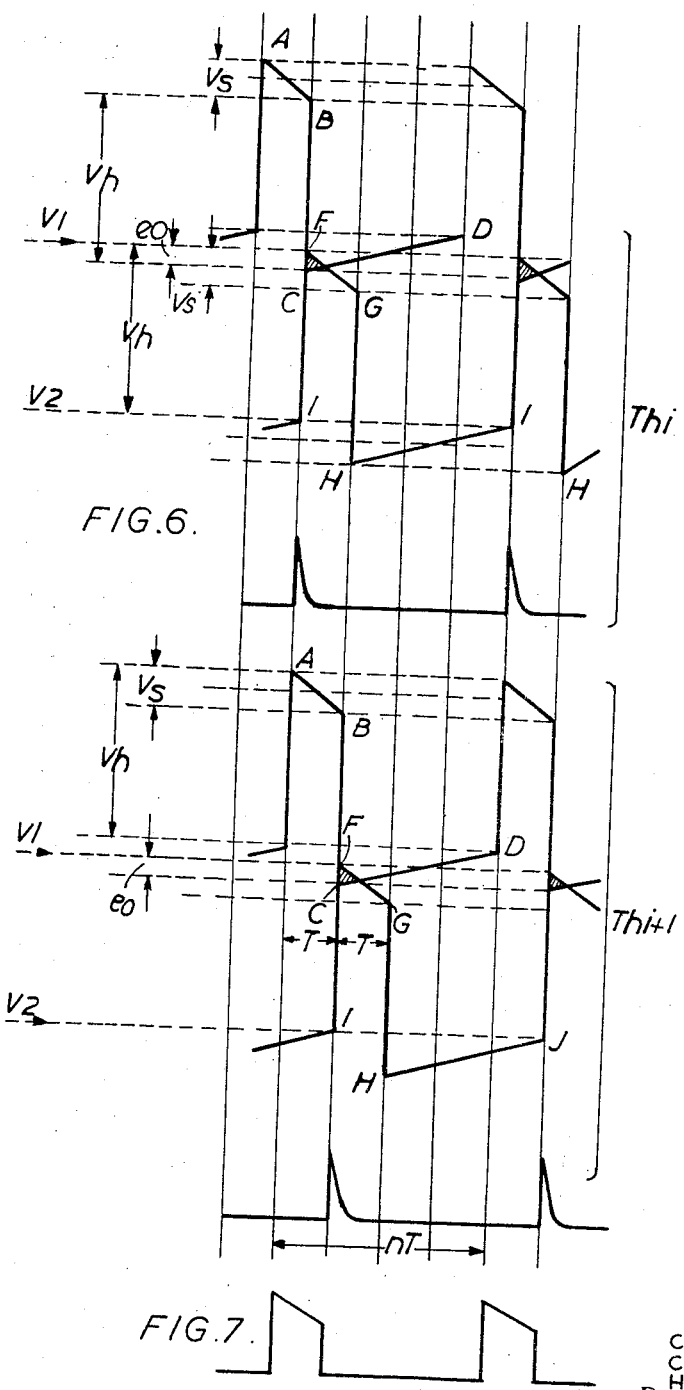

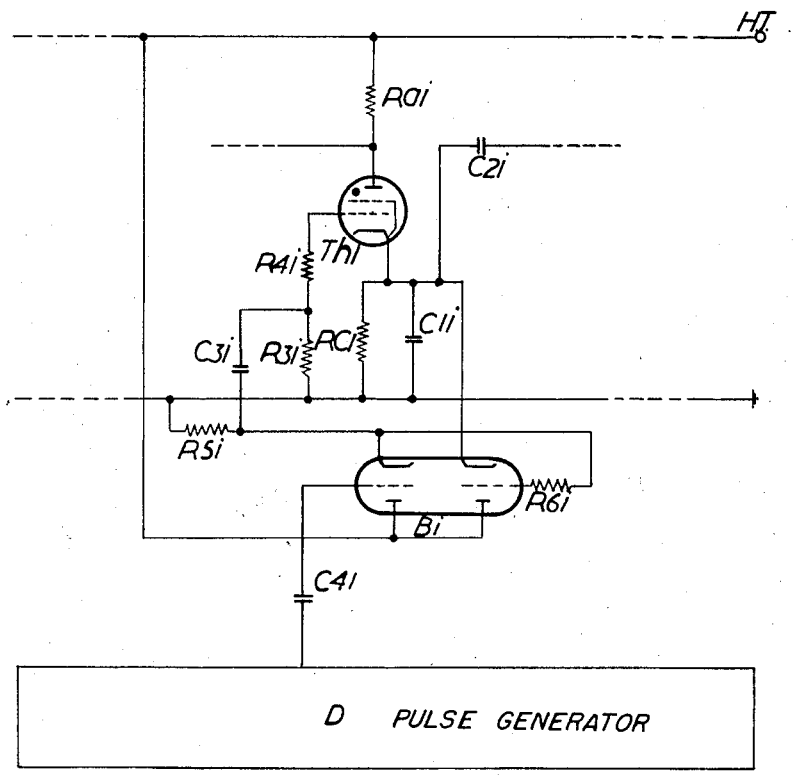

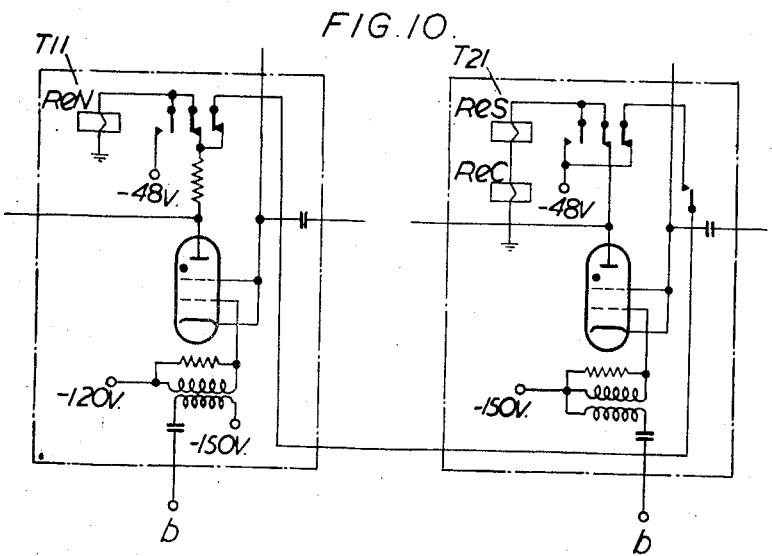
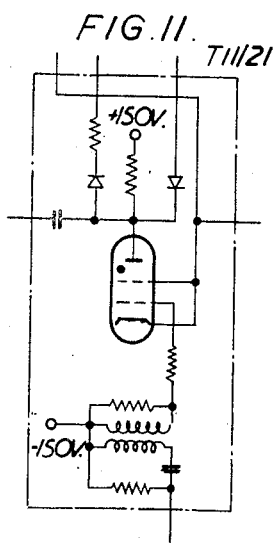

2,853,606

ELECTRIC PULSE CIRCUITS

Camille Weill, Garches, and Claude Hannigsberg, Vernouillet, France, and Hans Helmut Adelaar, Antwerp, Belgium, assignors to International Standard Electric Corporation, New York, N. Y., a corporation of Delaware Application August 2, 1954, Serial No. 447,306

Claims priority, application Belgium October 19, 1953

9 Claims. (Cl. 250—27)

The invention relates to electric pulse circuits. More particularly, one of its aspects relates to pulse corrector circuits for pulses issued from pulse distributors which produce series of pulses of same duration and period but staggered with respect to one another.

In the Belgian Patents Nos. 504,545 and 511,582 the use of gas tube devices and more particularly thyratrons has been disclosed as capable of reducing the rise and decay times of pulses which are fed to capacitive loads and this by supply of additional energy to said loads at predetermined moments from an auxiliary source. For each pulse to be corrected, one thyratron is needed for correcting the front flank of the pulse and another for correcting its rear flank. Essentially, the first thyratron, when conductive, is used as a series low charge impedance or switch for the output capacitance while the other, when conductive, is used as a shunt low discharge impedance or switch. The thyratrons are triggered at the right moment by trigger pulses appropriately located with respect to the pulses to be corrected and in the case of a pulse distributor the trigger pulse which makes a thyratron conductive to act as low shunt impedance for an outlet point is the same which makes another thyratron conductive to act as low series impedance for the next outlet point.

The use of such pulse corrector circuits for pulse distributors has also been described in the Belgian Patent No. 512,583.

An object of the invention is to reduce the number of gas tube switches necessary for correcting the edges of pulses issued from pulse distributors.

Another object of the invention is to realize a ring counter using electronic switching and producing high slope pulses.

Another object of the invention is to obtain safety measures for a pulse corrector circuit and more particularly to associate two pulse corrector circuits in a way which permits one to replace the other without disturbance to the loads if a fault occurs.

According to a main feature of the invention, there are provided a plurality of condensers and means to successively transfer a charge from one condenser to the next, with the characteristic that said condensers have one of their terminals connected to a fixed potential, that the other terminal of each condenser is connected to that of the next via normally open switching means, that means are provided to close those switching means interconnecting a condenser with the next while the other switching means remain open and that each switching means is serially connected with an E. M. F. of such value that the charge on any condenser at the moment that the switching means interconnecting it with the next condenser are about to be closed is the same for all condensers.

According to another feature of the invention, said E. M. F. serially connected with each switching means is replaced by an auxiliary condenser of suitable initial charge.

According to another feature of the invention, the switching means and the E. M. F.'s or auxiliary condensers serially connected are arranged in a closed ring, the arrangement being capable of serving as a ring counter or as a corrector circuit for pulses applied in a cyclic manner to each switching means of the ring in succession.

According to yet another feature of the invention the pulses applied for controlling the closure of each switching means are also applied to the condenser gaining charge as a result of said closure, whereby the corrected pulses across capacitive loads constituted by said plurality of condensers are substantially rectangular with imposed top and base levels.

According to a further feature of the invention two closed rings of switching means are provided in common for said plurality of condensers, one for normal service, the other as reserve, with means to replace any defective switching means of the normal service ring, by the corresponding switching means of the reserve ring and reversely.

According to a further feature of the invention, two pluralities of condensers are provided, one constituting normal service loads for a first closed ring of switching means in service, the other constituting dummy loads for a second closed ring of switching means in reserve, with means to associate, when defective, the first closed ring to said dummy loads whilst the second closed ring is then associated to said normal service loads.

According to a further feature of the invention, the switching means consist of thyratrons in each of which flows a current pulse of very short duration at the beginning of the control pulses applied to its trigger-electrode.

The above mentioned and other objects and features of the invention will become more apparent and the invention itself will be best understood by referring to the following description of embodiments of the invention taken in conjunction with the accompanying drawings in which:

Fig. 1 shows a plurality of condensers interconnected by a closed ring of switching means and E. M. F.'s;

Fig. 2 shows a plurality of condensers interconnected by a closed ring of switching means and auxiliary condensers;

Fig. 3 shows two closed ring arrangements provided in common for a plurality of condensers, one in service, the other as reserve;

Fig. 4 shows two pluralities of condensers and two closed ring arrangements, and means to interchange the relative association of each of the closed rings to each of the pluralities of condensers;

Fig. 6 shows the anode and cathode wave forms of two successive thyratrons of the embodiment of Fig. 5;

Fig. 7 shows the cathode wave form of any thyratron with a superimposed cathode bias;

Fig. 9 shows an embodiment using thyratron switches in which input pulses from a distributor are also applied to the cathode of the thyratrons;

Fig. 10 shows the details of one unit of the normal ring shown in Fig. 3, as well as those of one unit of the spare ring shown in that figure;

Fig. 11 shows the details of a unit used for both closed ring arrangements of Fig. 4.

Figure 5:
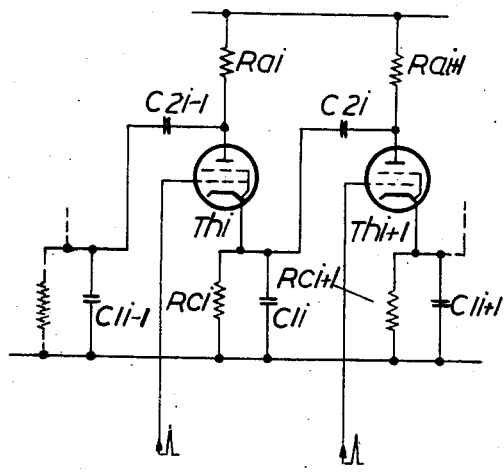
Fig. 5 shows two successive stages of the embodiment of Fig. 2 in which the switching means consist of thyratrons.

It is known that when a charged condenser discharges into a discharged condenser of equal capacity, half of the charge of the first condenser is transferred to the second condenser, half of the electrostatic field energy being lost during the charge transfer through radiation and heat production.

In the embodiment shown in Fig. 1, this loss is compensated by an E. M. F. Fig. 1 shows a closed ring circuit comprising $n$ equal capacitances such as $C_1$, $n$ switching means such as $S_1$, $n$ E. M. F.'s such as $e_1$. Each of the condensers such as $C_1$ may be temporarily connected to the next condenser $C_2$ via the E. M. F. $e_1$ and the switching means $S_2$, this being followed by a similar temporary connection between $C_2$ and $C_3$ (not shown) and so on.

One of the condensers can be initially charged from a D. C. source (shown as positive) via the impedance Z by temporarily closing the switch contact I, for example $C_n$ only if the switching means such as $S_1$ are all open. The switch $S_1$ can then be temporarily closed followed by the temporary closures of the next switches in cyclic manner. This can result in the initial charge on $C_n$, after contact I is again opened, being successively and integrally transferred to $C_1$, $C_2$, ... etc. as long as the contacts such as $S_1$ are cyclically closed, and by the judicious choice of the E. M. F.'s.

Indeed, it can be proved that if $V_1$ is the voltage across condenser $C_n$ before closure of $S_1$ while at the same time the voltage across $C_1$ and that provided by $e_n$ are $V_2$ and $V_3$ respectively, after closure of the switch the voltage across $C_1$ will become $$\frac{V_1+V_2+V_3}{2}$$

while that across $C_n$ will become $$\frac{V_1+V_2-V_3}{2}$$

This assumes that the resistance of the source $e_n$ together with that of the switch $S_1$ is very small while the negative pole of $e_n$ is connected to $C_n$. Therefore, if condenser $C_1$ must now have a voltage $V_1$ across its plates one must have $V_3=V_1-V_2$ and the voltage across $C_n$ after the closure of the switch $S_n$ will then be $V_2$, showing that the two condensers have exchanged their respective voltages.

The arrangement can therefore be used as a counter, by closing successively, by means not shown in Fig. 1, the various switches, starting with that following immediately the initially charged condenser. Then, if only $C_n$ has a voltage $V_1$ across its plates at the start, after the closure of $S_1$ it will have zero voltage while $C_1$ will have acquired a voltage $V_1$, $e_n$ producing a voltage equal to $V_1$. This action will be repeated at the closure of $S_2$ and the initial charge across $C_n$ will therefore travel along the closed chain as long as the switches are sequentially closed. This can easily be obtained by supplying driving pulses of period T which can be made to close any of the switches if they are allowed to pass a gating device individual to the switch and which is unblocked by the charge across the corresponding condenser, i. e. when $C_n$ is charged, the first driving pulse will be allowed to close switch $S_1$ and that switch only while the next pulse will be allowed to close switch $S_2$ due to condenser $C_1$ now being charged and so on. The closure of the switches need not cover the period T and can occur during a very small fraction of the latter since the transfer of charge is practically instantaneous by virtue of the low resistances of the E. M. F.'s and of the switches. Pulses of period T and of duration T will be obtained across the various condensers but will all be staggered with respect to one another.

Instead of charging initially one of the condensers via Z, rectangular pulses can be applied successively and in a cyclic manner across the condensers, at time positions corresponding to the closure of switching means.

These cyclic pulse sources together with their source resistances are shown in dotted lines on Fig. 1, e. g. $E_1$ feeding $C_1$ through $R_1$. If the arrangement described above is not used, one has the case of pulses from a distributor fed to individual condenser loads, which means that the flanks of the pulses across the condensers will be distorted by an amount depending on the time constant such as $C_1R_1$.

Assuming that all pulse sources such as $E_1$ have the same base and top potentials V and $V+v$ respectively, at the moment the potential of $E_n$ goes down to V and that of $E_1$ goes up to $V+v$, the arrangement of Fig. 1 will permit the potential across $C_n$ to move instantaneously to V and that across $C_1$ to $V+v$, provided $e_n$ is equal to $v$, with the negative pole connected to $C_n$ and that switch $S_1$ is momentarily closed at that moment.

A formal analysis of the circuit comprising $E_n$, $R_n$, $C_n$, $e_n$, $E_1$, $R_1$ and $C_1$ shows that the potential across condenser $C_1$ is given by $$V+v+\frac{V_3-v}{2+r/R}-\frac{2V+v-V_1-V_2}{2}e^{-\frac{t}{CR}}+\left(\frac{\frac{vr}{2R}+V_3}{2+r/R}+\frac{V_1-V_2}{2}\right)e^{\frac{-(2+r/R)t}{Cr}} \quad (1)$$

with $t$ starting from the moment at which $S_1$ is closed and where $V_1$ and $V_2$ are the initial voltages across condensers $C_n$ and $C_1$ respectively, $V_3$ the E. M. F. voltage, and where $r$ is the combined resistance of the E. M. F. in series with the switch, R being the resistance of all the sources such as $E_1$ (normally $r$ is much smaller than R).

If R is very small, a very short time after the closure of $S_1$ one can already neglect the second exponential term and if $V_1$ the original voltage across $C_n$ is $V+v$ while $V_2$ the original voltage across $C_1$ is V, it is clear that by making $V_3=v$, the voltage across $C_1$ will immediately become $V+v$ as required.

It will be remarked by considering (1) that if $V=v=0$ one is brought back to the arrangement shown in full lines in Fig. 1 with the distinction however that there is a shunt resistance across each condenser and, again neglecting the second exponential term a very short time after the closure of $S_1$ due to $r$ being very small, the voltage across $C_1$ is given by $$\frac{V_3+(V_1+V_2)e^{-\frac{t}{CR}}}{2} \quad (2)$$

If one makes $V_3$ again equal to the difference between the original voltages across $C_n$ and $C_1$, i. e. $V_1-V_2$, it is clearly equal to $V_1$ immediately after the switch is closed and thereafter decays towards $$\frac{V_1-V_2}{2}$$

should switch $S_1$ remain closed long enough or towards zero should it be opened, each time in accordance with the value of the time constant $C_1R_1$.

Another solution consists in providing the compensation for the energy loss during the transfer by charged condensers instead of E. M. F.'s.

It can be proved that if the E. M. F.'s such as $e_n$ are replaced by auxiliary condensers of capacities $a$ times that of the main condensers and charged to a voltage $V_3$ before the closure of the following switch such as $S_1$, when this occurs, $C_1$ will acquire a voltage $$\frac{V_1+(1+1/a)V_2+V_3}{2+1/a}$$

instead of $V_2$, while $C_n$ will acquire a voltage $$\frac{(1+1/a)V_1+V_2-V_3}{2+1/a}$$

instead of $V_1$, again assuring that the resistance of the switch is very small. If condenser $C_1$ must have a voltage $V_1$ across its plates after closure of the switch one must have $V_3=(1+1/a)(V_1-V_2)$ and the voltage across $C_n$ after closure of the switch will then be $V_2$, showing that the use of an auxiliary condenser of suitable initial charge also permits the successive condensers to exchange their respective voltages.

An embodiment making use of such auxiliary condensers instead of E. M. F.'s is shown in Fig. 2 and represents another closed ring circuit for $n$ condensers such as $C_{11}$, $n$ switching means such as $S_1$ and comprising $n$ auxiliary condensers such as $C_{21}$. The switching means are closed successively and in a cyclic manner as explained in conjunction with Fig. 1 and when the switching means $S_1$ is closed, condenser $C_{1n}$ loses via the auxiliary condenser $C_{2n}$ a charge which is gained by condenser $C_{11}$.

However, whereas the E. M. F. keeps its voltage $V_3$ after the transfer of the charge, the auxiliary condenser does not and after closure of $S_n$ its voltage has become $$\frac{2aV_3-V_1+V_2}{2a+1}$$

which is equal to $V_1-V_2$ if $V_3$ is the value suitable for the exchange of the voltages $V_1$ and $V_2$, i. e. $(1+1/a)(V_1-V_2)$. The auxiliary condenser has therefore lost a charge which must be replenished if a cyclic working is to be obtained.

To this end a positive supply source (+) is connected to all stages via individual resistors such as $Ra_1$ as shown. During the intervals between switch closures, the auxiliary condensers such as $C_{2n}$ will be able to regain their original voltage $V_3=(1+1/a)(V_1-V_2)$. This however is in contradiction with the condition that the voltage across $C_{1n}$ which has become $V_2$ immediately after the closure of $S_1$ should still be at that value when $S_n$ is about to be closed. This is necessary, to be in the same conditions at the closure of $S_n$ than at the closure of $S_1$ considering condensers $C_{1n}$ and $C_{11}$ respectively.

To permit the condenser such as $C_{1n}$ to have a potential $V_2$ across its plates when $S_n$ is about to be closed while at the same time the auxiliary condensers are allowed to regain their original voltage $V_3=(1+1/a)(V_1-V_2)$, a resistance across the condensers such as $C_{11}$ has to be considered. These are shown by resistors such as $Rc_1$ across $C_{11}$ in Fig. 2. Then, the exponential variations between switch closures can be established by considering the solution of the circuits such as $Ra_2$, $C_{21}$, $C_{11}$, $Rc_1$ and it will be possible to determine the constants for continuous operation. Four equations for the exponential variations can be established and solved:

(1) When the voltage across $C_{11}$ varies from $V_1$ to another value $V_4$ during a time T between the reopening of $S_1$ and the closure of $S_2$.

(2) When this voltage varies from $V_4-(V_1-V_2)$ immediately after the closure and reopening of $S_2$ to $V_1$ when $S_1$ is again about to be closed and this during a time $(n-1)T$.

(3) When the voltage across $C_{2n}$ in series with $C_{1n}$ varies from $V_1$ to another value $V_5$ during a time $(n-1)T$ between the reopening of $S_1$ and the closure of $S_n$.

(4) When this voltage varies from $V_5+V_1-V_2$ immediately after the closure and reopening of $S_n$ to $V_1+(1+1/a)(V_1-V_2)$ when $S_1$ is again about to be closed and this during a time T.

If the resistances such as $Ra_1$ and $Rc_1$ are sufficiently large with respect to the resistance of the switches such as $S_1$ and if the latter close during a time which is small with respect to T, the resistances play no part in the practically instantaneous voltage changes which occur when the switches are closed and which have been defined above.

In the case of Fig. 2 pulses can also be applied successively and in a cyclic manner across the condensers such as $C_{11}$ as shown in the dotted line. If the potential of the sources such as $E_1$ moves from V during a time $(n-1)T$ to $V+v$ during a time T, by providing the auxiliary condensers with a voltage $(1+1/a)v$ when the following switch is about to be closed, pulses with sharp flanks will be obtained across the condensers such as $C_{11}$, their top and base levels being fixed at $V+v$ and V by the input pulses.

The manner of operating the switches in sequence will now be described in relation to the production over capacitive loads of a set of $n$ pulse series of period $nT$ and duration T which do not overlap and have sharp flanks, assuming that $n$ pulse sources delivering trigger pulses of period $nT$ and phase shifted by multiples of T from one another are available.

In the embodiment which is shown partially in Fig. 5, the switching means consist of thyratrons. Only two thyratrons of the ring: $Th_i$, $Th_{i+1}$ have been shown, as this is sufficient for the understanding of the operation which is carried out in a cyclic manner.

The anode of thyratron $Th_i$ is connected to the junction point of its anode resistor $Ra_i$ and the auxiliary condenser $C_{2,i-1}$, whilst its cathode is connected to the junction point of the condenser $C_{11}$ and the auxiliary condenser $C_{2i}$. Anode resistor $Ra_i$ also forms part of the charging circuit of the auxiliary condenser $C_{2,i-1}$. Condensers such as $C_{11}$ represent the capacitive load across which the pulses must be produced. The trigger pulses are applied to the trigger electrodes of the respective thyratrons which are forced to discharge almost instantaneously and for a very short duration just to enable the charge on condenser $C_{11-1}$ to be transferred to condenser $C_{11}$ via the thyratron. This action will be repeated from one condenser to the other in accordance with trigger pulses arriving successively at the grids of successive thyratrons.

The wave forms at the cathodes and anodes of thyratrons are shown at Fig. 6.

It can be seen that when a thyratron is fired its anode potential $(c)$ overshoots its cathode potential $(F)$. This results from the distributed inductance of the circuit. Also, the cathode potential is instantly raised which means that the grid-cathode bias drops sharply whereby the grid will retain control of the discharge and the latter is bound to be terminated with the end of the trigger pulse. When the discharge is started, the anode voltage tends to rise due to the charge through $Ra$ while the cathode voltage tends to decrease due to the discharge through $Rc$, but this effect will be small and will not prevent a rapid deionization if the time constants are sufficiently large. Therefore, as soon as a thyratron fires, it is caused to extinguish almost immediately and prevented from reoperating before the following pulse at its grid after a time $nT$.

This arrangement has the advantage of giving a safety margin of almost one time unit for the deionization period (decay of the thyratron current).

The vertical portions of the cathode waveform shown in Fig. 6 are all equal if an exchange of voltages between one cathode condenser and the next is considered and a continuous operation is obtained. Therefore, during any exponential portion of this waveform, a cathode condenser will gain or loose a voltage which will be lost or gained during the next exponential portion since this will cause a cyclic operation of period $nT$. Such increasing and decreasing exponential variations are permissible in view of the circuit such as $Rc_i$, $C_{11}$, $C_{2i}$, $Ra_{i+1}$.

By making certain assumptions, the circuit of Fig. 2, when used to produce sharp rectangular pulses and when the switches are constituted by thyratrons as shown in Fig. 5, can be analysed taking into account the fact that the anode potential drops below the cathode potential:

(1) $a$ is assumed to be sufficiently large so that the potential across the auxiliary condenser does not vary substantially when the thyratron the anode of which is connected thereto discharges. It means also that the anode flank B—C which is equal to $(1+1/a)(V_1-V_2)$ becomes practically equal to $V_1-V_2$ which is equal to the remaining anode flank A—D and to the two cathode flanks I—F and G—H.

(2) The time constant formed by the anode resistor with the auxiliary condenser is assured to be large with respect to $n$T which means that the voltage across the auxiliary condenser will also not vary during the intervals between thyratron discharges, e. g. A—B and C—D. This, together with the first assumption, means that the anode voltage of a thyratron follows the cathode voltage of the preceding thyratron.

(3) The time constant formed by the cathode resistor with the main condenser is also assured to be large with respect to $n$T which means that the variations such as F—G and H—I are considered as linear. In relation with the preceding assumption, it means also that the variations such as A—B and C—D as linear.

Then, the anode and cathode waveforms are identical and the unknown quantities are the height of the four flanks, i. e. $V_1-V_2=V_h$, the height of the four linear steps, i. e. $V_5$ (A—B, D—C, F—G, I—H) and a reference level such as $V_1(F)$ for the top of the cathode waveform.

When a thyratron is fired, its anode potential undershoots its cathode potential as stated previously. The amount of undershooting voltage $e_o v$ (F—C) is assumed to be independent of the circuit constants $Ra$, $Rc$, $C_1$, $C_2$ and can be determined experimentally.

The unknowns $V_5$, $V_h$ and $V_1$ can be found by setting up three equations.

The first is obtained by stating that the average current in the cathode resistor is equal to the average current through the anode resistor. This is justified since the condensers loose no energy on an average basis. As the average anode potential is $$V_1-e_o+\frac{V_s}{2}+\frac{V_h}{n}$$

and the average cathode potential is $$V_1-\frac{V_s}{2}-V_h\left(1-\frac{1}{n}\right)$$

by virtue of the previous three assumptions an equation can be directly set up.

The second is obtained by considering that the charge lost by the auxiliary condenser during the discharge of the thyratron the anode of which is connected thereto, and which is equal to the product of the capacity of the main condenser by $V_h$, must be replenished by the average current through the anode resistor integrated over a period $n$T. As the corresponding average anode potential is given above, an equation can also be set up.

The third is obtained by considering that the change of charge for the main condenser during a time T between the upward and the downward voltage flanks, and which is given by the product of the capacity of the main condenser by $V_s$, is equal to the difference between the current through the cathode resistor and that through the anode resistor integrated over a time T. As the average cathode and anode potentials over that period are respectively given by $$V_1-\frac{V_s}{2} \text{ and } V_1+\frac{V_s}{2}+V_h-e_o$$

by virtue of the three assumptions, a third equation can be set up.

The solution of these three equations provides the values $V_s$, $V_h$ and $V_1$.

To avoid the variable level between H and I of the cathode waveform a suitable fixed bias may be superimposed at the cathode of the thyratron. The corresponding cathode waveform is shown in Fig. 7.

Figure 8:
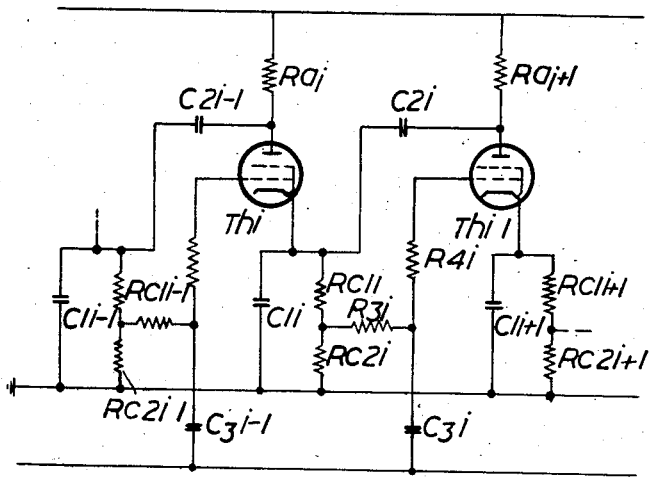
Fig. 8 shows an embodiment making use of thyratron switches, each discharging thyratron priming the following thyratron, a common input lead being used for all thyratron trigger electrodes.

The simplified theory given immediately above remains valid for the embodiment shown in Fig. 8 in which the arrangement is used as a counter producing series of rectangular pulses of duration T and period $n$T and with sharp flanks, starting from a single source of trigger pulses of period T. However, these pulses alone are insufficient to cause the discharge of the thyratrons.

When a thyratron such as T$h_1$ discharges the potential rise at the junction point of resistors $Rc_{11}$, $Rc_{21}$ is communicated via the resistor-capacitor network comprising resistors $R_{31}$, $R_{41}$ and condenser $C_{31}$ to the trigger electrode of the next thyratron.

Alone this potential rise of the trigger electrode of the next thyratron is insufficient to fire it, but with the simultaneous occurrence of an input pulse on the common lead connected to all condensers such as $C_{31}$ this will take place. The arrangement functions therefore as a gating device in relation to the application of the input driving pulses.

The sharp-edged pulses as shown in Fig. 6 although suitable as far as the suppression of rise and decay times is concerned, are not convenient for application where rigorously rectangular wave-forms are required across the capacitive loads.

An embodiment is shown in Fig. 9 in which the rectangular pulse outputs (only one of which is shown) of the pulse generator D are divided in two paths one for the control of the closure of the thyratron switches for flank correction, the other for applying the generator pulses directly across the capacitive loads such as $C_{11}$ to impose the top and base level of the output pulses as explained in conjunction with Figs. 1 and 2. In this manner the major pulse power across the capacitive loads is taken from the pulse generator.

The division in two paths as shown by way of example is achieved by means of a double triode Bi forming two cathode followers in cascade to provide a buffer stage as disclosed in Belgium patent 529,009 granted November 22, 1954. The circuit $C_{31}$—$R_{31}$ acts as differentiator to provide the trigger pulses for the thyratron.

Fig. 3 shows an embodiment used also as pulse corrector but in which two rings of switching means e. g. four in each, are used with a same plurality of capacitive loads $C_{1/4}$, the ring on the left comprising the four stages T$_{11/14}$ being used for normal service, whilst the ring on the right comprising the four stages T$_{21/24}$ stands in reserve.

The arrangement is supplied from two identical distributors which are not shown but which have each four outlet points $P_{11/14}$ and $P_{21/24}$ supplying trigger pulses via decoupling rectifiers to the two rings as shown. All these pulses have the same period $n$T. The pulses at $P_{12}$ and $P_{22}$ are phase-shifted by T from those at $P_{11}$ and $P_{21}$ which are in phase, those at $P_{13}$ and $P_{23}$ are phase-shifted by 2T and those at $P_{14}$ and $P_{24}$ by 3T. Therefore, in case of failure of one source, the corresponding one will continue to supply the trigger pulses. The pulses at $P'_{11/14}$ and $P'_{21/24}$ correspond respectively to those at $P_{11/14}$ and $P_{21/24}$ except that they all have a duration of T. They are applied in pairs to the respective condensers $C_{1/4}$ to provide the required top and base levels and the twin feeding via rectifiers again permits a failure occurring on one side to be of no consequence.

When a switching means such as T$_{11}$ is defective, it is automatically replaced by the corresponding switching means T$_{21}$ of the reserve ring or reversely.

When the switching means consist of thyratrons, a unit such as T$_{11}$ is designed as shown on the left of Fig. 10 and a unit such as T$_{21}$ is designed as shown on the right of Fig. 10.

Normally, a thyratron of unit T$_{11}$ of the service ring has priority of operation as its trigger electrode is biassed to a higher voltage than the trigger electrode of the corresponding reserve thyratron in T$_{21}$. The trigger pulses are applied to terminals $b$.

Normally, relays $ReN$ and $ReS$ remain released as they do not operate for short current pulses. Relay ReC is also released as long as the thyratron in $T_{21}$ is not fired.

If the service thyratron in $T_{11}$ fails to discharge, the reserve thyratron in $T_{21}$, which is otherwise prevented from ionizing due to the immediate increase of voltage across the condensers $C_1$ (Fig. 3) which is the common cathode load, discharges, relay ReC operates whilst relay ReS remains released. Thus relay ReN operates via its two outer back contacts, the front contact of relay ReC and a back contact of relay ReS. It locks through its inner make contact, disables its thyratron and its energization can be used to raise an alarm.

If the service thyratron in $T_{11}$ fails to extinguish at the end of a discharging pulse relay ReN operates directly via its inner break contact with the same consequences as above and the next trigger pulse at $b$ will fire the reserve thyratron in $T_{21}$. When the reserve thyratron in $T_{21}$ discharges for a normal pulse duration relay ReC can operate without effects but relay ReS cannot.

If for any reason both thyratrons in $T_{11}$ and $T_{12}$ fire simultaneously but the last remains permanently ionized, both relays ReS and ReC operate in series, thus opening the anode circuit of the thyratron in $T_{21}$ which is disabled. However, means are provided so that relay ReS operates before relay ReC to prevent relay ReN from operating via the front contact of relay ReC and a back contact of relay ReS. These means can consist in a suitable design of the relays ReC, ReS and ReN and by using suitable capacitive shunts across these relays so that the operation of the sensitive relay ReC will be sufficiently delayed to permit the first operation of ReS which will then prevent ReC from operating ReN.

Fig. 4 shows another embodiment used as pulse corrector in which there are also two rings of stages $T_{11/14}$ and $T_{21/24}$.

To the normal service ring of stages $T_{11/14}$ are associated the service capacitive loads $C_{11/14}$ through break contacts 1/4 of relay Nr, whereas dummy capacitive loads $C_{21/24}$ are associated to the reserve ring $T_{21/24}$ through break contacts 1/4 of relay Dr.

If any switching means of the normal service ring is defective, i. e. fails to close or fails to reopen, the defect is detected by the control circuit $E_1$, causing the relay Ar to operate from $+150$ v. via a key contact $k_1$. In turn relay Cr operates through contacts $a_3$ and $d_5$. Then relay Nr operates through contacts $c_2$, $k_3$ (key contact) and $b_3$ and as a result relay Dr operates through contact $n_5$. The operation of relay Ar causes ground to be applied to terminal NUA through contact $a_2$ to raise a non-urgent alarm. The operations of relays Nr and Dr causes the connection of the reserve ring $T_{21/24}$ to the service capacitive loads $C_{11/14}$, the connection of the normal service ring $T_{11/14}$ to the dummy capacitive loads $C_{21/24}$ and the release of Cr.

A control circuit $E_2$ is also provided for the reserve ring to detect defective switching means in said ring. If a defect is detected relay Br is caused to be operated from $+150$ v. through key contact $k_1$. The energization of Br results in the energization of relay Cr through contacts $b_4$ and $d_5$. If it is assumed that in the meantime the fault in $T_{11/14}$ has been cleared eventually by putting a spare ring (not shown) in its place, relay Ar will have been released by the maintenance personnel clearing the fault by opening key contact $k_1$, so that when a fault now develops in $T_{21/24}$ causing the operation of relay Br, relay Nr is now held through contacts $c_2$ and $d_5$. Therefore, when relay Cr operates, relay Nr will release causing also the release of relay Dr previously held through contact $n_5$. The release of relays Nr and Dr causes a return to the connections as shown.

If Br operates when Dr and Nr are released, no transfer takes place, but a non-urgent alarm is given by applying ground through contact $b_2$, since Cr cannot operate. If Ar operates when Dr and Nr are operated, there is also no transfer since Cr cannot operate and a non-urgent alarm is also given by applying ground through contact $a_2$.

If relay Ar as well as relays Nr and Dr are operated when relay Br operates, relays Nr and Dr remain locked and there is no transfer back to the normal connections since there are then faults in both rings. In this case an urgent alarm is given by applying ground to terminal UA through contacts $a_1$ and $b_1$ in series. A similar situation will arise if relay Ar operates after relay Br had already been operated, relays Nr and Dr being released. Then relay Nr cannot operate since relay Cr, by operating through contacts $a_3$ and $d_5$, and together with relay Br prevents its energization. An urgent alarm will also be given in that case.

Each time relay Cr operates, it applies ground to the circuits $E_1$ and $E_2$ through contacts $c_1$ and $c_3$ to disable the tubes such as $VA_2$ which might otherwise fire during the transfer.

If the switching means $T_{11/14}$ and $T_{21/24}$ consist of thyratrons, a thyratron unit for either of the service and reserve rings is designed as shown in Fig. 11. These cooperate as shown with the control circuits $E_1$ and $E_2$ which are identical and comprise a pair of cold cathode tubes $VA_1$, $VA_2$.

The cold cathode tube $VA_1$ has its trigger electrode connected to the anodes of all the tubes of the service ring via rectifiers pointing in the direction of said cold cathode tube. The potential applied to the trigger electrode of $VA_1$ is therefore equal to the highest anode potential in the ring.

The cold cathode tube $VA_2$ has its trigger electrode connected to the anodes of all the tubes of the service ring via rectifiers pointing in the direction of these anodes. The potential applied to the trigger electrode of $VA_2$ is therefore equal to the lowest anode potential of the ring thyratrons.

The cathode biasses of $VA_1$ and $VA_2$ are chosen so that when the service ring is normal neither $VA_1$ nor $VA_2$ are fired.

If one of the thyratrons of the ring fails to discharge, $VA_1$ will be triggered.

If one of the thyratrons of the ring fails to extinguish after discharging, $VA_2$ will be triggered.

In both cases relay Ar is caused to operate through the main gap of either $VA_1$ or $VA_2$.

The control circuit $E_2$ associated with the reserve ring is identical to $E_1$ and causes the operation of relay Br under similar conditions in the reserve ring $T_{21/24}$.

The pulses across the service load $C_{11/14}$ will be rectangular as rectangular pulses from two identical distributors are connected from terminals $P'_{11/14}$ and $P'_{21/24}$ through decoupling rectifiers to the corresponding capacitance loads $C_{11/14}$. Clamping rectifiers biassed to $-150$ v. are also connected to each of these capacitances to fix the base levels of the output pulses, individual resistors in shunt across the respective capacitances being connected to $-150$ v. and serve the purpose already explained in relation to Fig. 2.

The pulses across the loads $C_{21/24}$ do not have fixed top and base levels as this is not necessary since they are not used outside the circuit of Fig. 4, but individual resistors are connected in shunt with the respective condensers $C_{21/24}$ so that the thyratrons can all work in the same conditions. These resistors are connected to $-150$ v. through a variable resistor to permit all thyratrons to work with the same mean anode potential.

Referring again to Fig. 11, a resistance of suitable value (not shown) may be inserted between the anode of the thyratron and the auxiliary transfer condenser. This is useful to limit the current peaks through the thyratrons and therefore to lengthen their life. This will naturally deteriorate the steepness of the pulse flanks and is a matter of compromise.

While the principles of the invention have been described above in connection with specific embodiments and particular modifications thereof, it is to be clear-

We claim:

1. Pulse circuit arrangement for a plurality of pulse sources arranged to generate interleaved trains of substantially rectangular pulses which together constitute a repeated pulse cycle, which comprises a plurality of load condensers equal in number to the number of sources and means for the successive transfer of charge from one condenser to the succeeding one, one terminal of each of the said condensers being connected to a fixed potential point, the other terminals thereof being connected together successively in pairs so as to constitute a closed ring circuit, via paths which each include a normally open switch and a source of voltage, means under the control of a corresponding pulse for closing and immediately thereafter opening again each of said normally open switches one at a time in sequence to enable each condenser to discharge into the next condenser, the sequence of operations being such that each condenser is charged to a predetermined voltage each time the corresponding switch is closed.

2. A plurality of condensers, a fixed potential source and means to successively transfer a charge from one condenser to the next, comprising means connecting one of the terminals of each said condensers to said fixed potential source, normally open switching means, means connecting the other terminal of each condenser to that of the next via said normally open switching means, means closing each said switching means interconnecting a condenser with the next while the other of said switching means remain open, a plurality of voltage sources consisting of auxiliary condensers each switching means being serially connected with an auxiliary condenser, means including a charge circuit from a supply source for initially charging each of said auxiliary condensers to such a value before the next switching means are closed that said closure results in the next condenser gaining a charge equal to that of the previous said originally charged condenser.

3. A plurality of condensers, a fixed potential source and means to successively transfer a charge from one condenser to the next, comprising means connecting one of the terminals of each said condensers to said fixed potential source, normally open switching means, means connecting the other terminals of each condenser to that of the next via said normally open switching means, means closing each said switching means interconnecting a condenser with the next while the other of said switching means remain open, a plurality of voltage sources each switching means being serially connected with one of said voltage sources of such value that the closure of said switching means results in the said next condenser gaining a charge equal to that of the originally charged condenser, and an equal plurality of pulse sources issuing pulses one after the other in a cyclic manner, means coupled to each pulse source for controlling one particular switching means so that the start of any pulse causes the closure of the corresponding switching means, said voltage sources and switching means being arranged in a closed ring, whereby sharp-edged pulses are obtained across said loads.

4. An arrangement according to claim 2 wherein means is provided for applying each pulse controlling the closure of the corresponding switching means, to that condenser out of the plurality which gains charge as a result of said closure, whereby the arrangement works as pulse corrector giving across said loads essentially rectangular pulses with imposed top and base levels.

5. A plurality of condensers as claimed in claim 4 in which the means for connecting one of said load condensers to the next include in common a plurality of series combinations of one of said switching means and one of said voltage source, only one of said series combinations being normally in service whereas the others are kept as reserve, and further auxiliary switching means for replacing at any stage of the closed ring a series combination in service having defective switching means by one of the series combinations in reserve at that stage.

6. Two pluralities of condensers each as claimed in claim 3, in which a first plurality of condensers constituting normal service loads and associated with a first closed ring of voltage sources and switching means, works as a normal corrector circuit for the output pulses across said normal service loads, and a second plurality of condensers constituting dummy loads associated with a second closed ring of voltage sources and switching means, works as a reserve corrector circuit normally correcting the output pulses across said dummy loads and that further auxiliary switching means are provided to associate said second closed ring to said normal service loads and said first closed ring to said dummy loads when said first closed ring is defective.

7. A plurality of condensers as claimed in claim 6 in which the switching means interconnecting two consecutive condensers of said plurality consist of a thyratron having an anode, a cathode and a trigger electrode, the anode of which is connected to a terminal of the auxiliary condenser of which the other terminal is connected to the first of said consecutive condensers, whereas the cathode of said thyratron is connected to the common point of the second of said consecutive condensers and of the next auxiliary condenser, so that upon a pulse being applied simultaneously at its trigger electrode and at its cathode a current pulse of very short duration flows through said thyratron to close for a short time the connection between said first and said second consecutive condensers and to insure that said thyratron is completely deionized before the occurrence of the following pulse at the trigger electrode of the next thyratron.

8. A plurality of condensers as claimed in claim 7, in which each thyratron includes an anode resistor forming part of the charging circuit of the auxiliary condenser connected to the cathode of the preceding thyratron.

9. A plurality of condensers as claimed in claim 7 in which all the thyratron trigger-electrodes are connected to a common lead on which are applied all the pulses in succession, each thyratron having a cathode resistor shunting the cathode condenser and a resistor and capacitor network provided between two successive thyratrons comprising two series resistors and a shunt capacitor, said shunt capacitor being connected between the junction point of said series resistor and said common lead, the first of said series resistors being connected to an intermediate point of said cathode resistor, the second of said series resistors being connected to the trigger electrode of the following thyratron, whereby the discharge in a thyratron at the occurrence of the corresponding input pulse on said common lead primes the following thyratron which in turn discharges a thyratron if said thyratron has not been primed as a result of the preceding pulse.

References Cited in the file of this patent

UNITED STATES PATENTS

| | | |
|---|---|---|
| 2,110,015 | FitzGerald | Mar. 1, 1938 |
| 2,157,690 | Clough | May 9, 1939 |
| 2,168,198 | Frink | Aug. 1, 1939 |
| 2,310,105 | Michel | Feb. 2, 1943 |
| 2,490,243 | Tellier | Dec. 6, 1949 |